United States Patent [19]

Hartig et al.

[11] 4,317,167
[45] Feb. 23, 1982

[54] CIRCUIT ARRANGEMENT FOR THE PROCESSING OF INFORMATION

[75] Inventors: Alfred Hartig; Harald Beckermann, both of Essen, Fed. Rep. of Germany

[73] Assignee: Ruhrtal Elektrizitäts-Gesellschaft Hartig GmbH & Co., Essen, Fed. Rep. of Germany

[21] Appl. No.: 77,474

[22] Filed: Sep. 20, 1979

[30] Foreign Application Priority Data

Sep. 21, 1978 [DE] Fed. Rep. of Germany ....... 2841073

[51] Int. Cl.³ ...................... G06F 15/46; G05B 23/02; G06F 11/00
[52] U.S. Cl. ....................................... 364/185; 371/9; 371/16; 371/62
[58] Field of Search ...................... 364/119; 371/9, 16, 371/62, 29, 66, 20

[56] References Cited

U.S. PATENT DOCUMENTS

| | | | |
|---|---|---|---|
| 4,096,990 | 6/1978 | Strelow | 371/16 |
| 4,104,724 | 8/1978 | Dix et al. | 364/119 X |
| 4,118,792 | 10/1978 | Struger et al. | 364/119 X |
| 4,125,763 | 11/1978 | Drabing et al. | 371/20 |
| 4,133,027 | 1/1979 | Hogan | 364/119 |

OTHER PUBLICATIONS

Coffin et al., "Power System/Operating System Communications", IBM Tech. Discl. Bull.-vol. 22, No. 8B, Jan. 1980, p. 3507.

Galli et al., "Dynamic Detection and Monitoring of State-Change Information in Microprocessor Engines'-'-IBM Tech. Dis. Bull.-Dec. 1976, p. 2554.

Primary Examiner—Joseph F. Ruggiero
Attorney, Agent, or Firm—Karl F. Ross

[57] ABSTRACT

A circuit arrangement in which an information processor which includes at least one microprocessor, especially a microprocessor responding to measurement, control or regulatory signals in an energy supply installation, an industrial plant or process or the like, is monitored by a control unit which responds upon a failure of the microprocessor to provide a failure signal which can be used to alert an operator.

10 Claims, 2 Drawing Figures

CIRCUIT ARRANGEMENT FOR THE PROCESSING OF INFORMATION

FIELD OF THE INVENTION

Our present invention relates to information processing systems and, more particularly, to microprocessor-control installations and processes utilizing, for example, so-called firmware and may be employed for regulatory, control or information transmitting purposes, responsive to measurement, control or regulatory signals in energy-producing and industrial installations.

BACKGROUND OF THE INVENTION

While microprocessors have found widespread application in computer installations which are directly monitored by the user, e.g. in installations having a user-operated terminal, an even more widespread application is in control and data processing installations using the microprocessor as part of so-called firmware in which the microprocessor is associated with a programmed storage or memory and responds to a variety of input signals to effect a variety of controlled functions depending upon the preprogrammed instructions.

Such circuitry can be used in energy supply installations, e.g. power plants, in industrial installations to control machinery or chemical processes, and the like.

Such systems are of particular advantage where decentralized control or local control is required or desired, i.e. where at a particular site in the plant, various measurement, control or regulatory signals are generated or arise and must be processed or monitored to perform or induce certain control functions. It is frequently impractical to transmit all of the monitored signals to a central location and return the various control function signals to the controlled location and hence microprocessor-controlled units may be provided at such locations to undertake many if not all of the required control functions.

Microprocessors have the advantage that they can perform tens of thousands of control functions or switching functions with a highly compact unit which can, by association with the programmable or read only memory, have an astonishingly wide variety of responses.

However, a disadvantage of microprocessor units in a decentralized or local application is that frequently a failure of the microprocessor remains unnoticed and not responded to for dangerously long periods which may be seriously detrimental in energy-producing or industrial installations. This is especially a problem because the highly complex nature of the microprocessor itself may obscure a failure.

OBJECTS OF THE INVENTION

It is, therefore, the principal object of the present invention to improve upon the reliability of microprocessor units of the aforedescribed type and utilized for the purposes mentioned.

Another object of the invention is to provide a circuit arrangement which will allow a practically immediate response to a failure of the microprocessor unit notwithstanding the high complexity of the microprocessor thereof.

Yet another object of the invention is to provide the greatest possible reliability of microprocessor units employed in the local or decentralized control of power plants, industrial installations and the like.

SUMMARY OF THE INVENTION

The objects and others which will become apparent hereinafter are attained, in accordance with the present invention, in a microprocessor unit in which the microprocessor receives input signals and under the control of a programmable or programmed memory, produces the respective output signals for local control in one of the aforementioned types of installations and in which circuitry is provided to permanently and locally monitor the operation of the microprocessor to produce an output signal in the event of a function failure of the microprocessor.

When the unit comprises a plurality of microprocessors, each of the microprocessors can have a respective control unit or a single control unit of the present invention can be commutated to the various microprocessors for monitoring all of them.

In either case, the control unit responds to any function failure of the microprocessor, i.e. a partial or total failure, with maximum reliability. This ensures prompt notice to an operator and allows corrective measures to be taken immediately.

According to a feature of the invention, the control unit may monitor a special control terminal of the microprocessor at which a control signal can be applied which is a function of a significant operating parameter, namely, an internally developed voltage, a current or a functional state of a digital control stage which can represent the overall function of the microprocessor. For example, a clock pulse output of the microprocessor may be monitored since practically all defects in microprocessor operation are reflected in a variation of the clock pulse output.

It is also possible, additionally or alternatively, to provide the control unit so that it applies a control signal to an input of the microprocessor and monitors an output signal generated by this control signal input. In this case, the control unit functions as an active, rather than passive, unit which can respond to any parameter of the returned signal, e.g. signal level, signal form, signal duration or the like. Upon the return of an improper control signal, the control unit responds to produce a failure signal output.

Alternatively, the control unit can apply control signals to a control terminal of the microprocessor and respond to return signals to analyze them as to signal height, signal form and signal duration.

When the control signals are applied to a normal input and the signals are obtained from a normal output of the microprocessor, the latter need not have any special control terminal. In this case, the control signals are processed in accordance with any program which may be prestored in the unit, e.g. in any operating memory of the microprocessor or any programmable memory connected thereto.

The method of monitoring the microprocessor for failure allows numerous control functions of the microprocessor to be treated because the program may be designed to cycle through all stages of the microprocessor in producing the output.

With the system of the present invention, the microprocessor is monitored actively and, advantageously, at a cadence which can be determined by a control signal generated by the microprocessor itself, e.g. utilizing the microprocessor clock pulse generator. In this case, the control pulses or clock pulses should be first passed through at least one of the functional units of the microprocessor so that the proper functioning of as many of the units of the microprocessor as possible will be monitored. Naturally, in the programming of the microprocessor for its functions in the installation, care must be taken to avoid any conflict between its primary functions and programming for processing the control signals.

It has been found to be advantageous, when the microprocessor provides a control signal at predetermined time intervals, to form the control unit with a time constant network which effectively is reset by the control signal of the microprocessor and which, upon exceeding a predetermined time between successive control signals, recognizes a failure and generates an output signal.

The time constant network may be energized through a constant current source to rebuild the charge which is annihilated by each control signal. A threshold circuit connected to the time constant circuit can then be used to signal the failure.

While the control unit may be a separate element it may also be part of the microprocessor and in this case the microprocessor can be provided with a self-monitoring terminal at which the failure signal is developed. In this case, the circuitry must be designed so that the signal can also signify a failure of the voltage or current supply to the microprocessor.

The output signal can operate an acoustic and/or optical alarm or in addition or alternatively can be an electronic alarm signal which can be transmitted to a central station or used to switch into operation a standby microprocessor which can be connected in parallel to the first-mentioned microprocessor and can replace the latter with a minimum of time lag. It has been found to be advantageous, moreover, to separate the voltage or current supplies to the control unit from those of the microprocessor so that the control unit can remain functioning in the event the microprocessor fails.

BRIEF DESCRIPTION OF THE DRAWING

The above and other objects, features and advantages of the present invention will become more readily apparent from the following description, reference being made to the accompanying drawing, in which.

SPECIFIC DESCRIPTION

Figure 1:
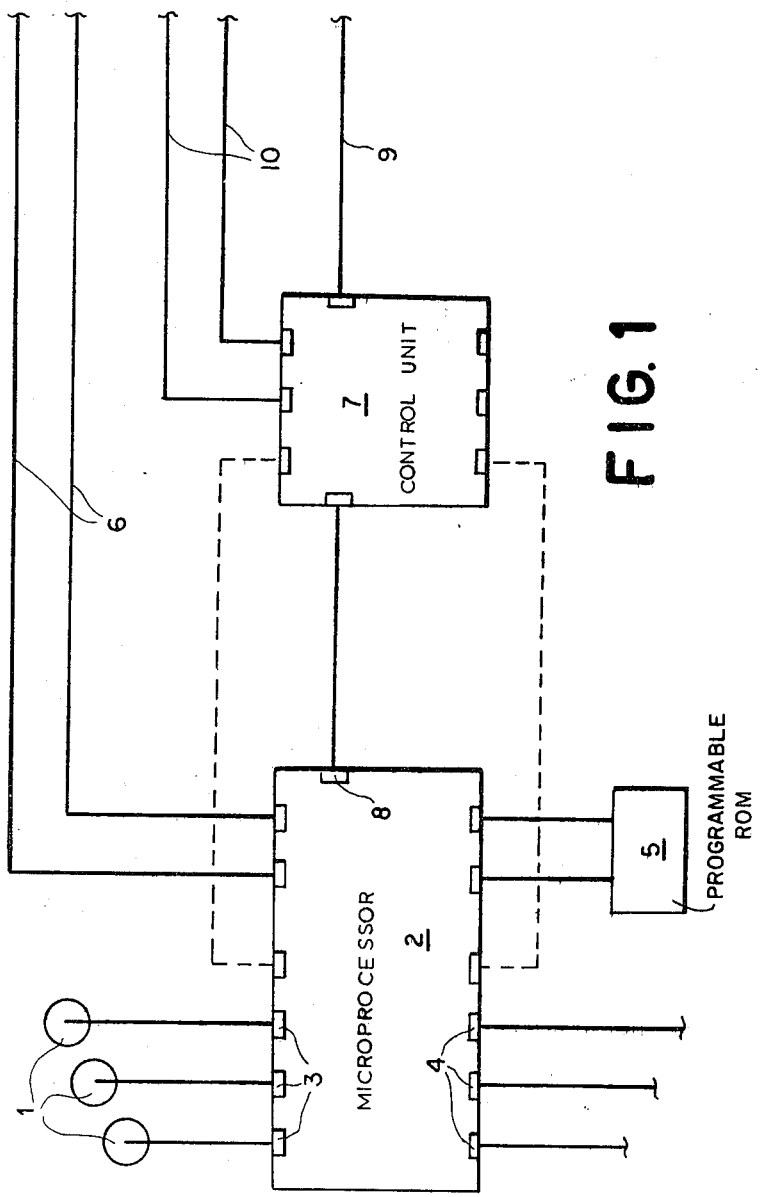
FIG. 1 is a diagram illustrating the unit of the present invention.

A firmware unit is illustrated diagrammatically in FIG. 1 and comprises, for example, an INTEL 8080 microprocessor 2 having three inputs 3 connected to respective detectors or signal generators 1 responsive to conditions in the installation to be monitored, e.g. electric power plant or an industrial plant. Three of the outputs 4 transmit control signals responsive to the input signals in accordance with a predetermined program which can, for example, have been stored in a programmable read only memory or ROM 5 although any other memory used with a microprocessor may be employed here as well.

The microprocessor 2 is also provided with a power supply here represented by the voltage supply lines 6 and conventional in the art.

The operation of the microprocessor is permanently (continuously) monitored, in accordance with the present invention, by a control unit 7. In the event of a failure of the microprocessor, an output signal is generated by the control unit 7 at its line 9. The monitoring of the microprocessor 2 can be effected through a control signal appearing at the control terminal 8 of the microprocessor upon the application of a control signal from the unit 7 thereto.

In broken lines we also show the application of a control signal to an input 3 of the microprocessor which, upon processing in the latter, is transformed into an output signal at a terminal 4 which is applied to the control unit.

The voltage/current supply 10 of unit 7 is shown to be separate from the supply 6 for the microprocessor.

Figure 2:
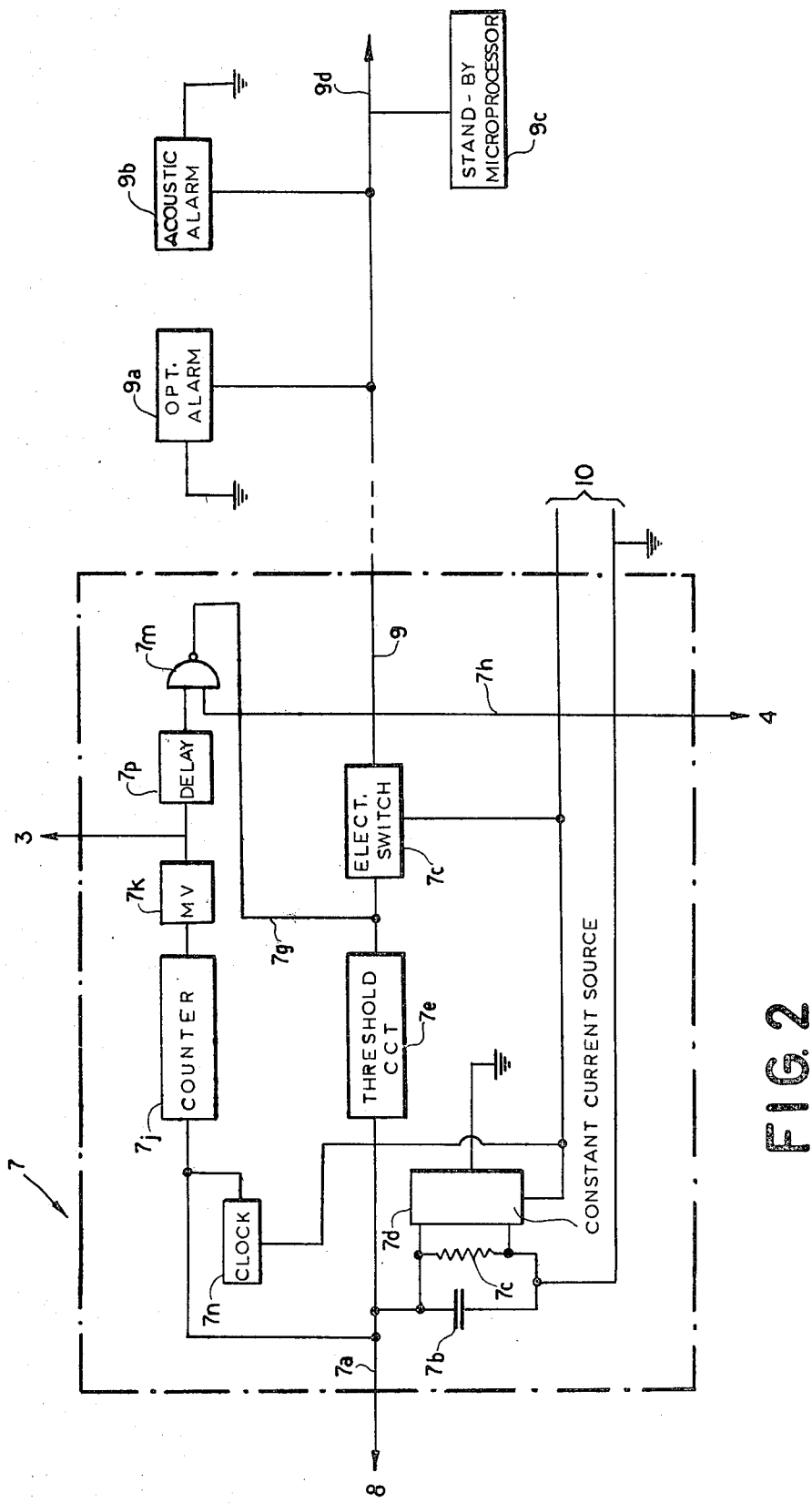
FIG. 2 is a circuit diagram showing the control unit in greater detail.

An example of control unit circuitry which may be used is given in FIG. 2 in which the control signal from the terminal 8 is applied via line 7a to a time constant network 7b, 7c whose capacitor 7b is charged by the constant current source 7d across the resistor 7c. The pulses appearing at line 7a when the microprocessor is properly functioning are dimensioned to drain the capacitor 7b.

Upon failure of these pulses, the voltage across the capacitor builds up to trigger a threshold circuit 7c, e.g. a Schmitt trigger (*Pulse, Digital and Switching Waveforms*, McGraw-Hill Book Co., New York, 1965, pp. 389 ff.) which triggers an electronic switch 7f (Op. Cit., pp. 192 ff.) producing an output at line 9 which, as has been shown, can be fed at 9d by telephone lines or the like to a central unit.

The signal, representing a failure of the microprocessor, can also be applied to an optical alarm 9a, an acoustic alarm 9b and to a standby microprocessor 9c which can be switched into circuit to replace the microprocessor 2.

In addition, the control unit can include a clock 7n energized by the independent voltage current supply 10 to generate clock pulses at a given cadence which are applied to a ring counter 7j triggering a multivibrator 7k upon counting up to the desired level and thereupon resetting. The change in state of the multivibrator generates a signal which is applied to the terminal 3 of the microprocessor and, via a delay circuit 7p, to a NAND gate 7m. The returned signal from the microprocessor 4 is delivered via line 7h to the other terminal of the gate 7m. Upon failure of coincidence the switch 7f is triggered to signal a failure of the multivibrator as noted. In place of the clock 7n, the pulses from the terminal 8 of the microprocessor may be passed to the counter 7j as clock pulses to generate the activating signal at terminal 3 and the return signal at terminal 4.

We claim:

1. An information-processing circuit comprising, in combination:
    a microprocessor-controlled unit responsive to input signals of an installation representing parameters of the operation thereof to be monitored and producing output signals for controlling said operation, said microprocessor-controlled unit including a microprocessor having a power supply source and a memory cooperating with said microprocessor; and
    a control unit connected to said microprocessor for continuously monitoring the operation thereof, said control unit being responsive to a control signal outputted from said microprocessor and including means for generating a failure signal upon detection of a functional failure of said microprocessor, said microprocessor outputting a train of control signals in predetermined time-spaced relationship which pass through at least one stage of the microprocessor prior to appearing at a control terminal thereof, said control unit being responsive to a failure in the train of control signals.

2. The information-processing circuit defined in claim 1 wherein said control unit includes a time constant network responsive to an excessive duration between control signals at said terminal.

3. The information-processing circuit defined in claim 2 wherein said time constant network is a resistor-capacitor network.

4. The information-processing circuit defined in claim 1 wherein said control unit forms part of the microprocessor.

5. The information-processing circuit defined in claim 4 wherein the microprocessor has a self-monitoring output terminal at which said failure signal appears.

6. The information-processing circuit defined in claim 1, further comprising an optoacoustic output device triggered by said failure signal and connected to said control unit.

7. The information-processing circuit defined in claim 1 wherein said failure signal is an electronic alarm signal.

8. The information-processing circuit defined in claim 1, further comprising a standby microprocessor operatively connected to said control unit and switched into said circuit upon the generation of said failure signal by said control unit in place of the first-mentioned microprocessor.

9. The information processing circuit defined in claim 1, further comprising an electric power supply for said control unit independent of the supply for said microprocessor-controlled unit.

10. A method of operating a microprocessor for the control of an electric pkower or other industrial installation which comprises the steps of:
  detecting a multiplicity of operating conditions at said installation and producing respective electrical input signals representing parameters of said operating conditions;
  applying said input signals to a preprogrammed microprocessor and generating a multiplicity of output signals representing preprogrammed relationships between the input signals and operational instructions to be commanded by said output signals;
  controlling operating parameters of said installation with said output signals;
  permanently monitoring the function of said microprocessor and generating a failure signal upon the functional failure thereof by generating within said microprocessor a train of control signals in predetermined time-spaced relationship which pass through at least one stage of the microprocessor before being outputted and detecting a failure of an outputted control signal of said train to generate said failure signal; and generating an alarm in response to said failure signal.

* * * * *